United States Patent
Miyake et al.

(10) Patent No.: US 9,103,945 B2
(45) Date of Patent: Aug. 11, 2015

(54) ATMOSPHERIC PRESSURE TENDENCY INFORMING APPARATUS AND ATMOSPHERIC PRESSURE TENDENCY INFORMING METHOD

(75) Inventors: Takeshi Miyake, Tokyo (JP); Kazuto Ushiyama, Tokyo (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 568 days.

(21) Appl. No.: 13/468,271

(22) Filed: May 10, 2012

(65) Prior Publication Data
US 2012/0285242 A1    Nov. 15, 2012

(30) Foreign Application Priority Data
May 13, 2011 (JP) ................................. 2011-107852

(51) Int. Cl.
*G01C 5/06* (2006.01)
*G01W 1/00* (2006.01)
(Continued)

(52) U.S. Cl.
CPC . *G01W 1/02* (2013.01); *G01W 1/00* (2013.01); *G04G 21/02* (2013.01); *G01C 5/06* (2013.01); *G01C 21/20* (2013.01); *G01S 19/42* (2013.01); *G01W 1/10* (2013.01)

(58) Field of Classification Search
CPC ........... G01W 1/00; G01W 1/02; G01W 1/04; G01W 1/06; G01W 1/10; G01W 1/18; G01W 2001/006; G01W 2001/0006; G01C 5/06
USPC .............................. 702/138, 139, 149; 73/384
See application file for complete search history.

(56) References Cited

U.S. PATENT DOCUMENTS

| 4,257,112 A | 3/1981 | Hubner |
| 5,224,059 A * | 6/1993 | Nitta et al. ...................... 73/384 |

(Continued)

FOREIGN PATENT DOCUMENTS

| CN | 1108770 A | 9/1995 |
| JP | 1-094210 A | 4/1989 |

(Continued)

OTHER PUBLICATIONS

Chinese Office Action dated Feb. 24, 2014 (and English translation thereof) in counterpart Chinese Application No. 201210147060.7.

*Primary Examiner* — John Breene
*Assistant Examiner* — Lynda Dinh
(74) *Attorney, Agent, or Firm* — Holtz, Holtz, Goodman & Chick PC

(57) ABSTRACT

An atmospheric pressure tendency informing apparatus and atmospheric pressure tendency informing method inform atmospheric pressure tendency. In one implementation, the atmospheric pressure tendency informing apparatus includes: an informing section, an atmospheric pressure measuring section, an atmospheric pressure inflection point judging section and an informing control section. The atmospheric pressure inflection point judging section judges whether there is an inflection point of atmospheric pressure, based on atmospheric pressure values of at least three points of time including an atmospheric pressure value measured at present. The informing control section controls the informing section to inform the inflection point of atmospheric pressure as the atmospheric pressure tendency based on a judgment result when the atmospheric pressure inflection point judging section judges there is an inflection point of atmospheric pressure.

8 Claims, 8 Drawing Sheets

(51) Int. Cl.
*G01W 1/02* (2006.01)
*G01W 1/10* (2006.01)
*G04G 21/02* (2010.01)
*G01C 21/20* (2006.01)
*G01S 19/42* (2010.01)

(56) References Cited

U.S. PATENT DOCUMENTS

| | | | |
|---|---|---|---|
| 5,500,835 A | | 3/1996 | Born |
| 5,802,016 A | * | 9/1998 | Kubota et al. .................. 368/11 |
| 6,584,839 B1 | * | 7/2003 | Hedrick ........................... 73/384 |
| 6,678,629 B2 | * | 1/2004 | Tsuji ............................ 702/139 |
| 6,684,175 B2 | * | 1/2004 | Yun .............................. 702/138 |
| 7,142,152 B2 | * | 11/2006 | Burgett et al. ................ 342/120 |
| 7,345,956 B2 | * | 3/2008 | Matthey ........................ 368/11 |
| 8,232,900 B2 | | 7/2012 | Takeda |
| 2012/0084006 A1 | | 4/2012 | Kawaguchi et al. |

FOREIGN PATENT DOCUMENTS

| | | |
|---|---|---|
| JP | 5-281367 A | 10/1993 |
| JP | 07035877 A | 2/1995 |
| JP | 2000-147140 A | 5/2000 |
| JP | 3108993 B2 | 9/2000 |
| JP | 2003-004864 A | 1/2003 |
| JP | 2003-050285 A | 2/2003 |
| JP | 2008-008798 A | 1/2008 |
| JP | 2009-115476 A | 5/2009 |
| JP | 2010-048632 A | 3/2010 |
| WO | WO 2012/046415 A1 | 4/2012 |

* cited by examiner

FIG. 3

| JUDGMENT ALGORITHM | MARK | MEANING | COMMENT |
|---|---|---|---|
| A0-A3 ≥ +6 hPa OR<br>A0-A2 ≥ +6 hPa OR<br>A0-A1 ≥ +6 hPa<br>AND<br>A0 > A1 AND<br>A0 > A2 AND<br>A0 > A3 | BARO ↑ | SHARP INCREASE OF ATMOSPHERIC PRESSURE | GENERALLY, NORTHWEST OR WESTERLY WIND BECOMES STRONG |
| A0-A3 ≤ -6 hPa OR<br>A0-A2 ≤ -6 hPa OR<br>A0-A1 ≤ -6 hPa<br>AND<br>A0 < A1 AND<br>A0 < A2 AND<br>A0 < A3 | BARO ↓ | SHARP DECREASE OF ATMOSPHERIC PRESSURE | GENERALLY, SOUTHEAST OR EASTERLY WIND BECOMES STRONG POSSIBILITY OF SEVERE WEATHER AT BOTH SEA AND MOUNTAIN |
| B4 ≥ 0 AND<br>B3 ≥ 0 AND<br>B2 ≥ 0 AND<br>B1 ≥ 0 AND<br>B ≥ + 4hPa<br>AND<br>B0 ≤ -1 hPa | BARO | PASSING OF HIGH ATMOSPHERIC PRESSURE, ETC. | SHOWS HIGH ATMOSPHERIC PRESSURE OR RIDGE OF ATMOSPHERIC PRESSURE PASSES POSSIBILITY WEATHER BECOMES WORSE CAUTION NECESSARY FOR CHANGE OF ATMOSPHERIC PRESSURE AND WEATHER |
| B4 ≤ 0 AND<br>B3 ≤ 0 AND<br>B2 ≤ 0 AND<br>B1 ≤ 0 AND<br>B ≤ - 4 hPa<br>AND<br>B0 ≥ + 1 hPa | BARO | PASSING OF LOW ATMOSPHERIC PRESSURE, ETC. | SHOWS LOW ATMOSPHERIC PRESSURE OR TROUGH OF ATMOSPHERIC PRESSURE PASSES IF ATMOSPHERIC PRESSURE CONTINUES TO INCREASE SLOWLY, WEATHER WILL RECOVER |
| SATISFIES NO CONDITION | NO OUTPUT | — | — |

ATMOSPHERIC PRESSURE TENDENCY INFORMING APPARATUS AND ATMOSPHERIC PRESSURE TENDENCY INFORMING METHOD

BACKGROUND OF THE INVENTION

1. Field of the Invention

The present invention relates to an atmospheric pressure tendency informing apparatus and an atmospheric pressure tendency informing method

2. Description of the Related Art

Lately, there is an apparatus as described in, for example, Japanese Patent No. 3108993 designed as an electronic device such as a watch, etc. including an atmospheric pressure measuring function, etc. provided with a pressure sensor, etc.

Such electronic device measures the atmospheric pressure at an interval of a predetermined amount of time, displays the result on the display section and informs the change in atmospheric pressure to the user.

When such function is used, a user can refer to the change in atmospheric pressure on a real time basis to determine subsequent action plans, etc. in outdoor activities such as mountain climbing or hiking.

SUMMARY OF THE INVENTION

The present invention has been made in consideration of the above situation, and one of the main objects is to provide an atmospheric pressure tendency informing apparatus and atmospheric pressure tendency informing method which can provide information easily understood by the user when atmospheric pressure change which should be considered in predicting the change in weather, etc. occurs.

In order to achieve any one of the above advantages, according to an aspect of the present invention, there is provided an atmospheric pressure tendency informing apparatus including:

an informing section which informs an atmospheric pressure tendency;

an atmospheric pressure measuring section which measures atmospheric pressure each time a predetermined amount of time passes;

an atmospheric pressure inflection point judging section which judges whether there is an inflection point of atmospheric pressure, based on atmospheric pressure values of at least three points of time including an atmospheric pressure value measured at present among a plurality of atmospheric pressure values measured successively by the atmospheric pressure measuring section; and an informing control section which controls the informing section to inform the inflection point of atmospheric pressure as the atmospheric pressure tendency based on a judgment result when the atmospheric pressure inflection point judging section judges there is an inflection point of atmospheric pressure.

According to another aspect of the present invention, there is provided an atmospheric pressure tendency informing apparatus including:

an informing section which informs atmospheric pressure tendency;

an atmospheric pressure measuring section which measures atmospheric pressure each time a predetermined amount of time passes;

an atmospheric pressure sharp change judging section which judges whether there is a sharp change in the atmospheric pressure based on atmospheric pressure values of at least two points of time including an atmospheric pressure value measured at present among a plurality of atmospheric pressure values measured successively by the atmospheric pressure measuring section; and an informing control section which controls the informing section to display a sharp change mark showing a sharp change of atmospheric pressure as the atmospheric pressure tendency based on a judgment result when the atmospheric pressure sharp change judging section judges that there is a sharp change in the atmospheric pressure.

According to another aspect of the present invention, there is provided an atmospheric pressure tendency informing method to be used in an atmospheric pressure tendency informing apparatus including an informing section which informs an atmospheric pressure tendency; and an atmospheric pressure measuring section which measures an atmospheric pressure value each time a predetermined amount of time passes, the method including:

an atmospheric pressure inflection point judging step which judges whether there is an inflection point of atmospheric pressure, based on atmospheric pressure values of at least three points of time including an atmospheric pressure value measured at present among a plurality of atmospheric pressure values measured successively by the atmospheric pressure measuring section; and an informing control step which controls the informing section to inform the inflection point of atmospheric pressure as the atmospheric pressure tendency based on a judgment result when the atmospheric pressure inflection point judging step judges there is an inflection point of atmospheric pressure.

According to another aspect of the present invention, there is provided an atmospheric pressure tendency informing method to be used in an atmospheric pressure tendency informing apparatus including an informing section which informs atmospheric pressure tendency; and an atmospheric pressure measuring section which measures an atmospheric pressure value each time a predetermined amount of time passes, the method including:

an atmospheric pressure sharp change judging step which judges whether there is a sharp change in the atmospheric pressure based on atmospheric pressure values of at least two points of time including an atmospheric pressure value measured at present among a plurality of atmospheric pressure values measured successively by the atmospheric pressure measuring section; and an informing control step which controls the informing section to display a sharp change mark showing a sharp change of atmospheric pressure as the atmospheric pressure tendency based on a judgment result when the atmospheric pressure sharp change judging step judges that there is a sharp change in the atmospheric pressure.

BRIEF DESCRIPTION OF THE DRAWINGS

The present invention and the above-described objects, features and advantages thereof will become more fully understood from the following detailed description with the accompanying drawings and wherein;

FIG. 3 is a diagram showing an example of the memory configuration of the ROM described in FIG. 2;

DETAILED DESCRIPTION OF THE PREFERRED EMBODIMENTS

An embodiment of the present invention is described with reference to the attached drawings.

An atmospheric pressure tendency informing apparatus of the present invention is described below as a watch including an atmospheric pressure change informing function.

However, an embodiment in which the present invention can be applied is not limited to this.

An embodiment of the watch including the atmospheric pressure change informing function (hereinafter referred to as simply "watch") is described.

Figure 1:
FIG. 1 is a diagram showing a front view of a watch including an atmospheric pressure tendency informing function of the present embodiment.

FIG. 1 is a diagram showing a front view of a watch of the present embodiment.

As shown in FIG. 1, the watch 100 of the present embodiment includes a main body case 1 formed in a hollow short column shape.

A band attaching section 2 to attach a watch band 3 is formed on both upper and lower edge sections (upper and lower edge sections shown in FIG. 1) of the main body case 1.

A plurality of switch sections 4 (in other words, operation buttons) to input various operation instructions to instruct setting of time, switching of various modes and the like is provided on the outer circumferential section of the main body case 1.

Figure 2:
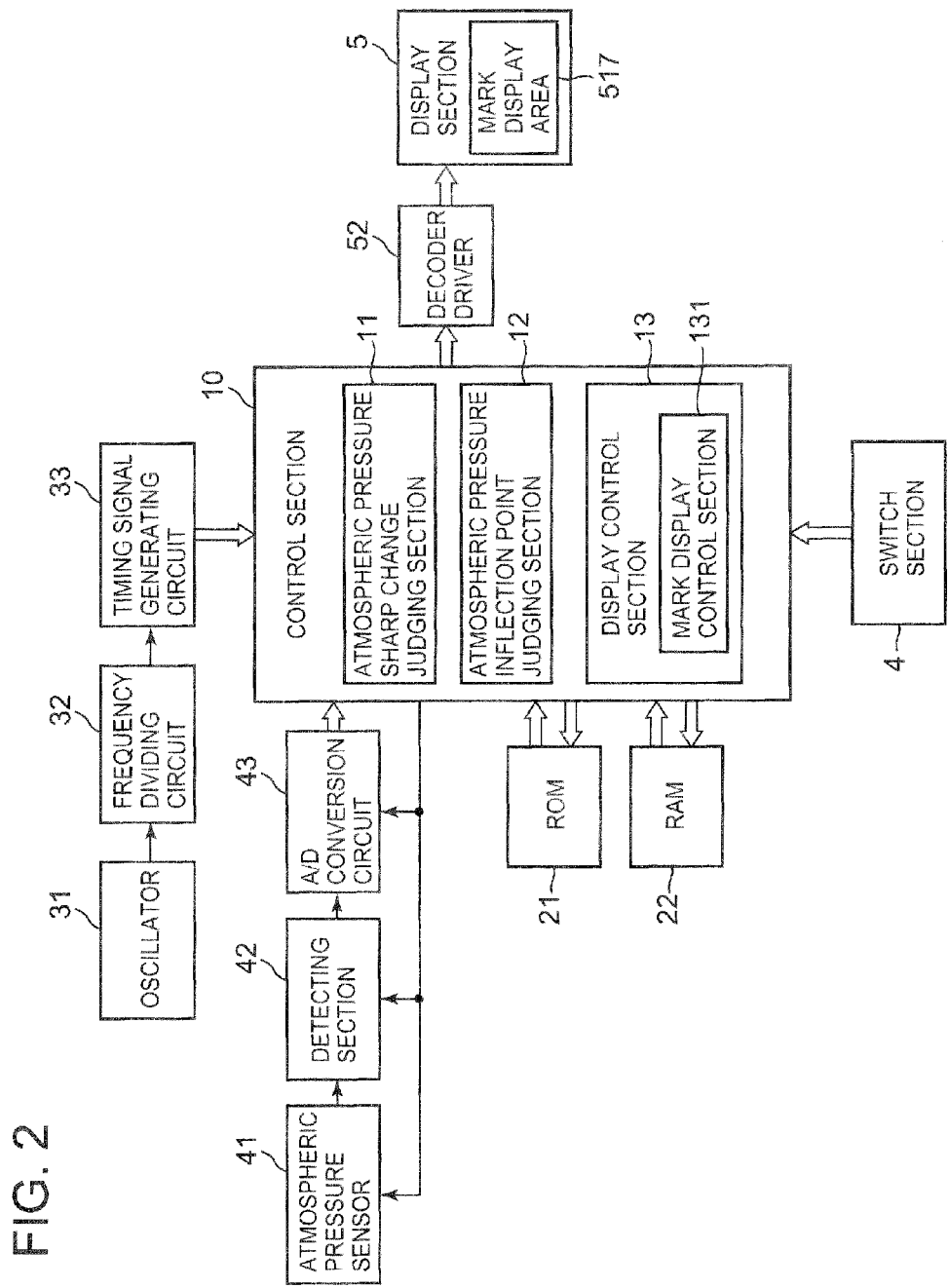
FIG. 2 is a block diagram showing a main configuration of the watch described in FIG. 1.

When an operation instruction is input by operating the switch section 4, a signal corresponding to the operation instruction is output to the control section 10 (see FIG. 2).

According to the present embodiment, any one of the plurality of switch sections 4 is the mode switching switch.

The mode switching switch is a switch to input an instruction to switch the display of the display section 5 to a barometer mode which displays a later described atmospheric pressure tendency display.

When the mode is switched to the barometer mode, as shown in FIG. 1, characters "BARO" which show that the mode is switched to the barometer mode is displayed in the mode display area 515 of the display section 5.

It is not a necessary element of the present invention to display the mode in the mode display area and a configuration which does not display the mode is possible.

A housing (not shown) embedded with a circuit substrate, etc. mounted with various electronic components is provided inside the main body case 1.

A wind preventing glass (not shown) formed from a material such as transparent glass is attached to an opening section on a front surface side of the main body case 1 so as to block the front surface side opening section.

A rear cap member (not shown) is attached to an opening section on a rear surface side of the main body case 1 so as to block the rear surface side opening section.

A display section 5 configured with a liquid crystal panel, etc. (not shown) as a display section including a digital display function is provided inside the main body case 1 between the wind preventing glass and the housing.

According to the present embodiment, the display section 5 displays various marks as later described atmospheric pressure tendency and functions as an informing section which informs atmospheric pressure tendency.

The display section 5 is not limited to a liquid crystal panel and other configurations can be employed such as organic EL (Electro-Luminescence).

The display section 5 is provided with a plurality of display areas such as a time display area 511 which displays time, a temperature display area 512 which displays temperature, an atmospheric pressure display area 513 which displays a last obtained atmospheric pressure value, an atmospheric pressure change graph area 514 which displays a graph showing change in atmospheric pressure for the past ten hours, a mode display area 515 which displays a presently selected mode, an atmospheric pressure difference value display area 516 which shows a relation between a last atmospheric pressure value and a past atmospheric pressure value, a mark display area 517 which shows a mark display as atmospheric pressure tendency and the like.

The temperature displayed in the temperature display area 512 can be the present temperature when the temperature is measured as necessary by the watch 100.

When the temperature is measured at an interval of a predetermined amount of time such as every hour, every two hours, etc., the temperature obtained last can be displayed.

An average value of temperatures measured within a certain amount of time can be displayed.

The atmospheric pressure displayed in the atmospheric display area 513 can be the present atmospheric pressure value when the atmospheric pressure is measured as necessary by the watch 100.

When the atmospheric pressure is measured at an interval of a predetermined amount of time such as every hour, every two hours, etc., the atmospheric pressure obtained last can be displayed.

An average value of atmospheric pressure measured within a certain amount of time can be displayed.

In the present embodiment, as described later, an example in which the atmospheric pressure value is measured every two hours is described.

The atmospheric pressure display area 513 displays the measurement value of the atmospheric pressure obtained last.

The atmospheric pressure change graph area 514 shows the raw data of change in atmospheric pressure for the past ten hours as a graph.

When the atmospheric pressure value is measured every two hours as in the present embodiment, the atmospheric pressure change graph area 514 displays a graph showing the measurement value of the last five times in a time series with dots.

The atmospheric pressure difference value display area 516 shows the difference value comparing the last value of atmospheric pressure with past value of atmospheric pressure displayed with a pointer.

For example, when the atmospheric pressure value measured last is 998 hPa and the atmospheric pressure value measured two hours ago is 1000 hPa, the decrease of atmospheric pressure is 2 hPa, and therefore, for example, the atmospheric pressure difference value display area 516 displays a display pointing a diagonally downward direction of two scales than the horizontal position.

The mark display area 517 is an area which displays the mark as the atmospheric pressure tendency.

According to the present embodiment, a mark showing sharp change in atmospheric pressure (upper two marks shown in FIG. 3, hereinafter simply referred to as "sharp change mark") and a mark showing there is an inflection point of atmospheric pressure (lower two marks shown in FIG. 3, hereinafter simply referred to as "inflection point mark") is displayed in the mark display area 517.

The mark as atmospheric pressure tendency shows an analysis result of analysis using a predetermined judgment algorithm (see FIG. 3) for raw data of change in atmospheric pressure.

In the present embodiment, the mark display area 517 includes six segments including five segments configured of an arrow portion and one segment configured of a character portion of "BARO" showing that the mode is the barometer mode (see FIG. 3).

Each segment can be switched independently between display and non-display according to control by a later described mark display control section 131.

By switching the portion to be displayed and not displayed, four types of marks as shown in FIG. 3 can be displayed.

According to the present embodiment, when the watch 100 is switched to the barometer mode, in addition to displaying the above marks, or after the above marks are displayed, a message showing the meaning of the mark, comment of what can be understood from the atmospheric pressure tendency, etc. can be displayed on the display section 5.

Display of such message or comment is not a necessary component of the present invention, and a configuration which does not display the above is possible.

The display section 5 of the present embodiment includes a configuration overlapping two liquid crystal panels.

For example, the atmospheric pressure difference value display area 516 is configured on a liquid crystal panel different from a liquid crystal panel configuring other display areas and can be displayed overlapped on other display.

The configuration of the display section 5 is not limited to the illustrated example.

The display section 5 does not need to include all of the display areas illustrated here and can include only some of the above.

The display section 5 can display items other than those illustrated above.

Next, the functional configuration of the watch 100 of the present embodiment is described with reference to FIG. 2.

For example, as shown in FIG. 2, the watch 100 is provided with a control section 10 configured with a CPU (Central Processing Unit), etc. which is not shown, a ROM (Read Only Memory) 21, a RAM (Random Access Memory) 22, an oscillator 31, a frequency dividing circuit 32, a timing signal generating circuit 33, an atmospheric pressure sensor 41, a detecting section 42, an A/D conversion circuit 43, a decoder driver 52, and the like.

The display section 5 is connected to the control section 10 through the decoder driver 52. In addition, the switch section 4 is connected to the control section 10 and the operation/instruction signal is output from the switch section 4 to the control section 10.

Although not shown, in addition to the above, a temperature sensor, etc. which measures the temperature can be provided to the watch 100.

The oscillator 31 includes, for example a crystal oscillator to output a clock pulse of, for example 32768 Hz and the clock pulse is supplied to the frequency dividing circuit 32.

The frequency dividing circuit 32 supplies the signal dividing the clock pulse supplied from the oscillator 31 to the timing signal generating circuit 33.

The timing signal generating circuit 33 generates various timing signals such as a time keeping signal (for example, 16 Hz) based on a signal supplied from the frequency dividing circuit 32 and supplies the signal to the control section 10.

The atmospheric pressure sensor 41 is configured with a semiconductor pressure sensor including, for example, a resistance bridge.

The resistance value of the resistance bridge changes according to the atmospheric pressure.

The detecting section 42 outputs to the A/D conversion circuit 43 detected voltage according to the resistance value of the atmospheric pressure sensor 41.

The A/D conversion circuit 43 converts the detected voltage to a digital signal and outputs the signal to the control section 10.

The control section 10 outputs a control signal to control operation of the atmospheric pressure sensor 41, the detecting section 42 and the A/D conversion circuit 43.

The control section 10 controls the atmospheric pressure sensor 41 to measure atmospheric pressure at an interval of predetermined amount of time. According to the present embodiment, the control section 10 controls the atmospheric pressure sensor 41 to measure the atmospheric pressure every two hours.

When the user operates the switch section 4 to switch the mode to the barometer mode, the control section 10 controls the atmospheric pressure sensor 41 to measure the present atmospheric pressure.

Figure 4:
FIG. 4 is a diagram showing an example of the memory configuration of the RAM described in FIG. 2.

The measurement result measured by the atmospheric pressure sensor 41 and output by the control section 10 is stored in the storage area of the RAM 22 associated with information of time when the atmospheric pressure is measured (see FIG. 4).

The timing and interval of time of measuring the atmospheric pressure with the atmospheric pressure sensor 41 is not limited to every two hours.

The atmospheric pressure can be measured at a longer interval or a shorter interval than the above.

The atmospheric pressure can be measured as necessary to obtain successive data.

In this case, all of the pieces of data can be stored or an average value of a certain amount of time can be obtained and stored.

The predetermined interval of time when the atmospheric pressure is measured by the atmospheric pressure sensor 41 can be determined in advance by default or the user can set the above later.

The decoder driver 52 decodes the display data output from the control section 10 (display control section 13) and outputs the display driving signal to the display section 5.

The display section 5 is configured with, for example, a dot matrix liquid crystal panel. The display section 5 displays according to the display driving signal output from the decoder driver 52.

The ROM 21 stores various programs to perform atmospheric pressure tendency display processing (atmospheric pressure tendency informing processing), time, etc. display processing, etc. in the watch 100 which is the atmospheric pressure tendency informing apparatus.

The control section 10 performs the above programs to centrally control each section of the watch 100.

The ROM 21 stores in advance a data table regarding the atmospheric pressure tendency display processing as shown in FIG. 3.

As shown in FIG. 3, the data table stores messages of the meaning of high atmospheric pressure, etc. passing mark and low atmospheric pressure, etc. passing mark which are the inflection point marks and atmospheric pressure sharp increase mark and atmospheric pressure sharp decrease mark which are the sharp change marks and comments of what can be understood from the atmospheric pressure tendency corresponded with each inflection point mark and each sharp change mark.

The ROM 21 functions as a storage section to store each mark and its meaning (in other words, message) and comments.

In the present embodiment, the marks, meanings and comments are stored in the ROM 21 with the judgment algorithm which judges whether to display the marks.

The content and configuration of the data table stored in the ROM 21 is not limited to the illustrated example.

For example, more items can be corresponded and stored, or only the judgment algorithms and the corresponding marks can be stored.

The RAM 22 includes a storage area which stores various pieces of data, etc. and a work area where programs, etc. are expanded when the control section 10 performs various processing (both are not shown).

The storage area of the RAM 22 includes, for example, a display register (see FIG. 4) which stores data of various display on the display section 5, and the like.

As shown in FIG. 4, the display register includes, for example, present time register, storage area of present atmospheric pressure value, storage area of atmospheric pressure value measured in interval, calculated result temporary storage area, and the like.

The present time register stores as necessary the present time obtained according to the timing signal output from the timing signal generating circuit 33.

The present time stored in the present time register is updated as necessary.

When the user operates the switch section 4 and the mode is switched to the barometer mode, and the present atmospheric pressure is measured by the atmospheric pressure sensor 41, the atmospheric pressure is stored corresponded with the present time that the atmospheric pressure is measured in the storage area of the present atmospheric pressure value.

For example, when the present time is pm 10:58 and the mode is switched to barometer mode, the atmospheric pressure is measured by the atmospheric pressure sensor 41.

For example, when the measurement value is 998 hPa, the measurement value 998 hPa is stored corresponded with the measurement time pm 10:58 in the storage area of the present atmospheric pressure value.

The present atmospheric pressure value can be obtained by one measurement or can be an average value, etc. calculated from measurement values of a plurality of measurements. The atmospheric pressure value measured at an interval of a predetermined amount of time (in the present embodiment, every two hours) is stored corresponded with the measurement time in the storage area of the atmospheric pressure value measured in interval.

The number of values of atmospheric pressure stored in the storage area of the atmospheric pressure value measured in interval is not limited. As described below in the present embodiment, the atmospheric pressure tendency is judged referring to the measurement values in a span of ten hours.

Therefore, pieces of data of at least ten hours (for example, when the atmospheric pressure is measured every two hours at an even hour, measurement values of five measurements) are stored.

In order to save amount of memory, it is preferable that each time new measurement value is obtained, the measurement value of more than ten hours before is successively deleted to update the value.

The measured atmospheric pressure value stored in the storage area of the atmospheric pressure value measured in interval can be obtained by one measurement or can be an average value, etc. calculated from measurement values of a plurality of measurements.

The calculated result temporary storage area stores calculated result, etc. calculated by applying the program or judgment algorithm to judge the atmospheric pressure tendency.

Next, the control section 10 centrally controls the watch 100, and functionally includes an atmospheric pressure sharp change judging section 11, an atmospheric pressure inflection point judging section 12, a display control section 13, and the like.

The functions as the atmospheric pressure sharp change judging section 11, the atmospheric pressure inflection point judging section 12, the display control section 13, etc. are realized by the control section 10 in coordination with the program stored in the ROM 21.

The atmospheric pressure sharp change judging section 11 is an atmospheric pressure sharp change judging member which judges whether or not there is a sharp change in the atmospheric pressure (in other words, sharp increase or sharp decrease of atmospheric pressure).

The atmospheric pressure sharp change judging section 11 reads out the atmospheric pressure value measured in a span of the past six hours from the present from the storage area of the RAM 22 and applies the judgment algorithm (see FIG. 3) stored in the ROM 21.

The atmospheric pressure value at the present time is to be A0, the atmospheric pressure value 1 measured to two hours before from the present time is to be A1, the atmospheric pressure value 2 measured from two hours to four hours before from the present time is to be A2, and the atmospheric pressure value 3 measured from four hours to six hours before from the present time is to be A3.

Figure 8:
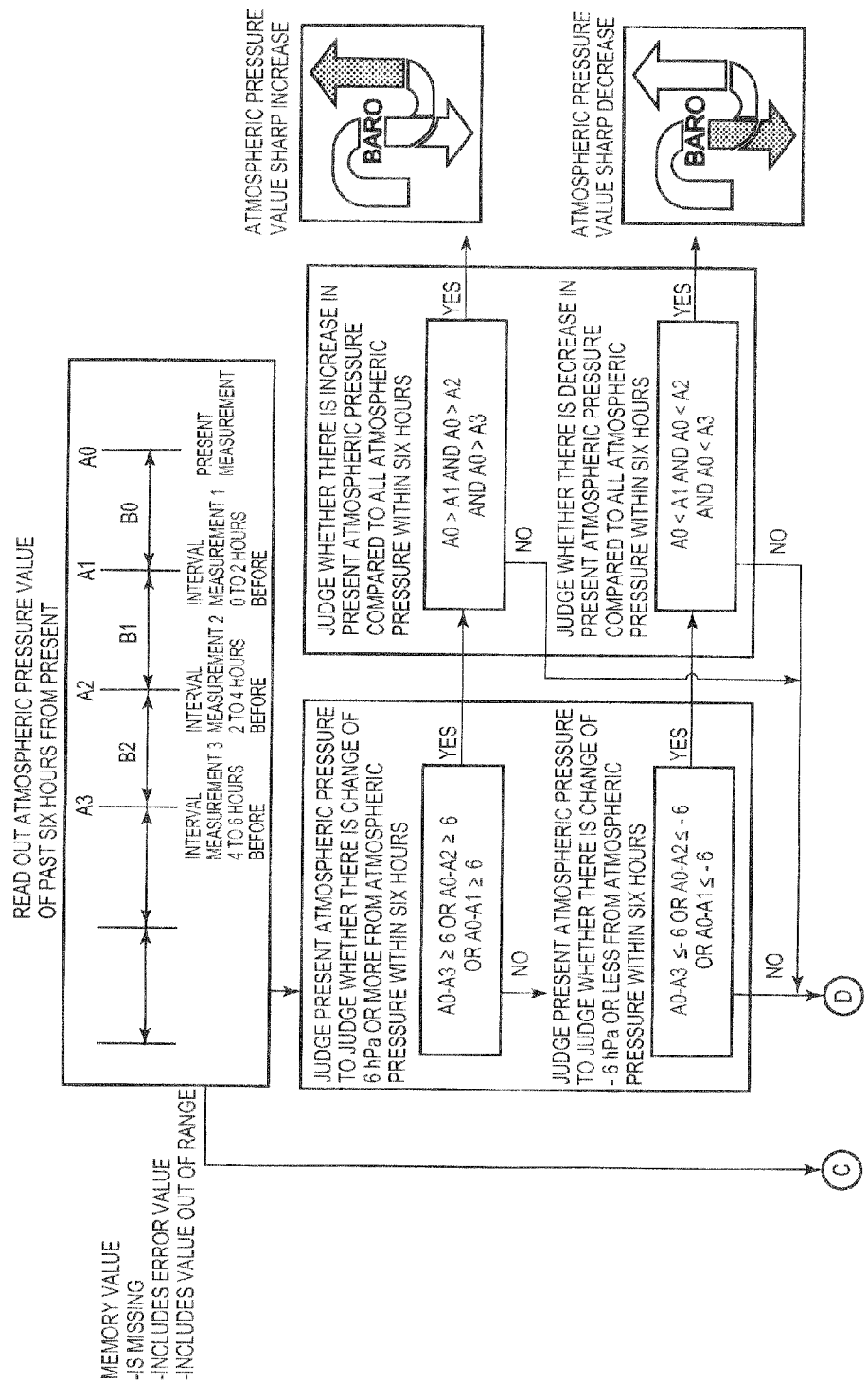
FIG. 8 is an explanatory diagram schematically showing atmospheric pressure tendency display processing described in FIG. 5.

Then, when it is judged whether or not there is a sharp change in the atmospheric pressure, as shown in FIG. 3 and FIG. 8, the atmospheric pressure sharp change judging section 11 judges the present atmospheric pressure value to judge whether there is a change of 6 hPa or more from the atmospheric pressure value within six hours.

Specifically, when judging whether or not there is a sharp increase of the atmospheric pressure, an algorithm is applied to judge whether a condition of A0-A3≥6 hPa or A0-A2≥6 hPa or A0-A1≥6 hPa is satisfied.

When judging whether or not there is a sharp decrease of the atmospheric pressure, an algorithm is applied to judge whether a condition of A0-A3≤-6 hPa or A0-A2≤-6 hPa or A0-A1≤-6 hPa is satisfied.

In the present embodiment, the value which is to be the threshold when judging that there is a sharp increase of the atmospheric pressure or a sharp decrease of the atmospheric pressure is not limited to ±6 hPa.

The present embodiment describes an example referring to an atmospheric pressure value measured in a span of the past six hours from the present, however, the referred atmospheric pressure value is not limited to the atmospheric pressure value measured in a span of the past six hours.

A measurement result of a longer amount of time can be referred.

Although it is possible to make a judgment by referring to a measurement result of a shorter amount of time than six hours, it is preferable to refer to a measurement result which is a long period of time to a certain extent in order to increase accuracy of judgment.

According to the present embodiment, since the atmospheric pressure is measured every two hours, the atmospheric pressure value measured in a span of the past six hours from the present is four times including the measurement of the present time.

When the atmospheric pressure is measured in an interval shorter than two hours, atmospheric pressure value of four times or more can be referred in the judgment.

Among the plurality of atmospheric pressures measured successively, the judgment is performed based on atmospheric pressure values of at least two points of time including at least the atmospheric pressure value measured at present.

It is preferable to refer to more measured atmospheric pressure values in order to enhance accuracy of judgment.

Next, when it is judged whether or not there is a sharp change in the atmospheric pressure, the atmospheric pressure sharp change judging section 11 judges whether there is an increase or a decrease of the present atmospheric pressure value compared to all of the atmospheric pressure values within the past six hours.

Specifically, when judging whether or not there is a sharp increase of the atmospheric pressure, an algorithm is applied to judge whether a condition of A0>A1 and A0>A2 and A0>A3 is satisfied.

When judging whether or not there is a sharp decrease of the atmospheric pressure, an algorithm is applied to judge whether a condition of A0<A1 and A0<A2 and A0<A3 is satisfied.

As a result of the above, according to the present embodiment, when the present atmospheric pressure value is higher than all of the atmospheric pressure values within the past six hours and the maximum difference from the atmospheric pressure value within the past six hours is +6 hPa or more, the atmospheric pressure sharp change judging section 11 judges that the atmospheric pressure is sharply increasing.

When the present atmospheric pressure value is lower than all of the atmospheric pressure values within the past six hours and the maximum difference from the atmospheric pressure value within the past six hours is −6 hPa or less, the atmospheric pressure sharp change judging section 11 judges that the atmospheric pressure is sharply decreasing.

The atmospheric pressure inflection point judging section 12 is an atmospheric pressure inflection point judging member which judges whether or not there is an inflection point of the atmospheric pressure based on the atmospheric pressure value of at least three points including the atmospheric pressure value measured at present among the plurality of atmospheric pressure values measured successively.

According to the present embodiment, the atmospheric pressure inflection point judging section 12 judges that there is the inflection point of the atmospheric pressure when after the atmospheric pressure value successively measured by the atmospheric pressure sensor 41 which is the atmospheric pressure measuring member increases a predetermined first atmospheric pressure value (according to the present embodiment, +4 hPa) or more, the atmospheric pressure value decreases a predetermined second atmospheric pressure value (according to the present embodiment, −1 hPa) or more, or after the atmospheric pressure value successively measured by the atmospheric pressure measuring member decreases a predetermined first atmospheric pressure value (according to the present embodiment, −4 hPa) or more, the atmospheric pressure value increases a predetermined second atmospheric pressure value (according to the present embodiment, +1 hPa) or more.

According to the present embodiment, the atmospheric pressure inflection point judging section 12 judges whether or not high atmospheric pressure, etc. passes or low atmospheric pressure, etc. passes.

Here, high atmospheric pressure, etc. includes for example, high atmospheric pressure, a ridge of atmospheric pressure, etc. and low atmospheric pressure, etc. includes for example, low atmospheric pressure, a trough of atmospheric pressure, front, etc. (see FIG. 3).

The atmospheric pressure inflection point judging section 12 reads out the atmospheric pressure value measured in a span of the past ten hours from the present from the display register of the RAM 22 and applies the judgment algorithm stored in the ROM 21 (see FIG. 3).

The atmospheric pressure value at the present time is to be A0, the atmospheric pressure value 1 measured up to two hours before from the present time is to be A1, the atmospheric pressure value 2 measured from two hours to up to four hours before from the present time is to be A2, the atmospheric pressure value 3 measured from four hours to up to six hours before from the present time is to be A3, the atmospheric pressure value 4 measured from six hours to up to eight hours before from the present time is to be A4 and the atmospheric pressure value 5 measured from eight hours to up to ten hours before from the present time is to be A5.

Moreover, A0-A1 is to be B0, A1-A2 is to be B1, A2-A3 is to be B2, A3-A4 is to be B3, A4-A5 is to be B4 and A1-A5 is to be B.

Figure 9:
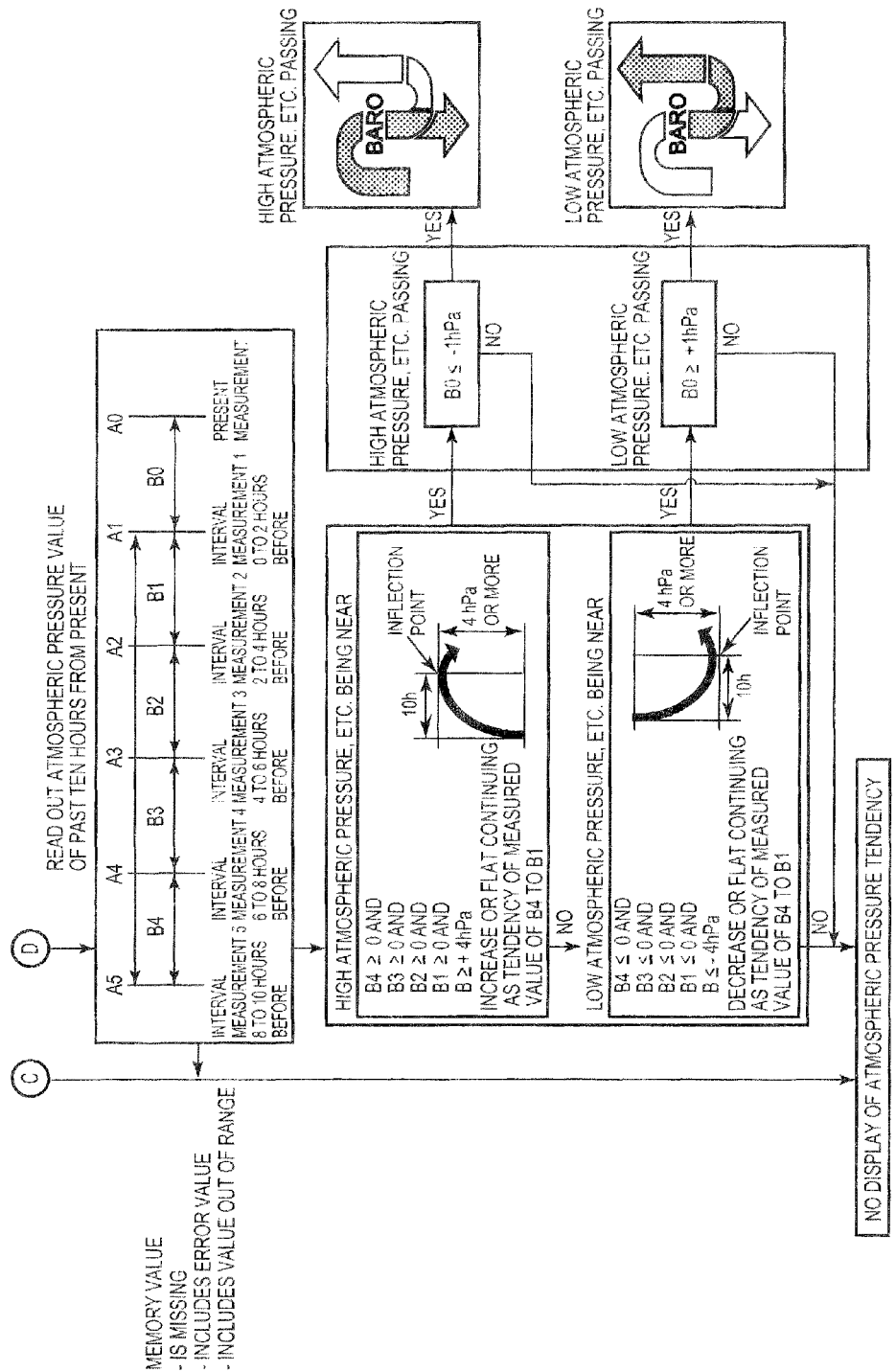
FIG. 9 is an explanatory diagram schematically showing atmospheric pressure tendency display processing described in FIG. 5.

First, as shown in FIG. 3 and FIG. 9, the atmospheric pressure inflection point judging section 12 judges whether or not the high atmospheric pressure, etc. is near.

Specifically, an algorithm is applied to judge whether a condition of B4≥0 and B3≥0 and B2≥0 and B1≥0 is satisfied and whether a condition of B4≥+4 hPa is satisfied.

When the atmospheric pressure inflection point judging section 12 calculates the values of B0 to B4 and B from the atmospheric pressure values of A0 to A5 stored in the storage area of the atmospheric pressure value measured in interval of the display register of the RAM 22, the value is stored in the calculated result temporary storage area of the display register of the RAM 22 (see FIG. 4).

The atmospheric pressure inflection point judging section 12 judges whether or not the low atmospheric pressure, etc. is near.

Specifically, an algorithm is applied to judge whether a condition of B4≤0 and B3≤0 and B2≤0 and B1≤0 is satisfied and whether a condition of B4≤−4 hPa is satisfied.

As a result of the above, according to the present embodiment, when a state of increase or no change ("FLAT" shown in FIG. 9) as a tendency of the difference values of B4 to B1 continues and the atmospheric pressure increases 4 hPa or more within a span from the past two hours to ten hours, the atmospheric pressure inflection point judging section 12 judges that the high atmospheric pressure, etc. is near.

When a state of decrease or no change ("FLAT" shown in FIG. 9) as a tendency of the difference values of B4 to B1 continues and the atmospheric pressure decreases 4 hPa or more within a span from the past two hours to ten hours, the atmospheric pressure inflection point judging section 12 judges that the low atmospheric pressure, etc. is near.

The present embodiment describes when the atmospheric pressure inflection point judging section 12 judges that the high atmospheric pressure, etc. or the low atmospheric pressure, etc. is near, however, the value of the threshold to judge that the high atmospheric pressure, etc. or the low atmospheric pressure, etc. is near is not limited to ±4 hPa.

The present embodiment describes an example where an atmospheric pressure value measured in a span of the past ten hours from the present is referred, however, the referred atmospheric pressure value is not limited to the atmospheric pressure value measured in a span of the past ten hours.

A measurement result of a longer amount of time can be referred.

Although it is possible to make a judgment by referring to a measurement result of a shorter amount of time than ten hours, it is preferable to refer to a measurement result which is a long period of time to a certain extent in order to increase accuracy of judgment.

Next, the atmospheric pressure inflection point judging section 12 judges whether or not there is an inflection point of the atmospheric pressure by judging whether or not the high atmospheric pressure, etc. or the low atmospheric pressure, etc. passes after the high atmospheric pressure, etc. or the low atmospheric pressure, etc. is near.

The atmospheric pressure inflection point judging section 12 reads out the value of B0 stored in the calculated result temporary storage area (see FIG. 4) of the display register of the RAM 22.

Then, the atmospheric pressure inflection point judging section 12 applies the judgment algorithm (see FIG. 3) stored in the ROM 21 to judge whether or not there is a change of 1 hPa or more in the atmospheric pressure value (see FIG. 9) from the past 0 hours to two hours.

In other words, as shown in FIG. 3 and FIG. 9, when judging whether or not high atmospheric pressure, etc. passes after the high atmospheric pressure, etc. is near, an algorithm is applied to judge whether a condition of B0≤−1 hPa is satisfied.

When judging whether or not low atmospheric pressure, etc. passes after the low atmospheric pressure, etc. is near, an algorithm is applied to judge whether a condition of B0≥+1 hPa is satisfied.

The present embodiment describes an example which judges the high atmospheric pressure, etc. or the low atmospheric pressure, etc. passes when there is a change in atmospheric pressure in the opposite direction, however, the value of the threshold to judge that the high atmospheric pressure, etc. or the low atmospheric pressure, etc. passes is not limited to ±1 hPa.

As a result of the above, according to the present embodiment, when a state of increase or no change continues as an atmospheric pressure tendency from ten hours before and when the increase is 4 hPa or more and then the decrease is 1 hPa, the atmospheric pressure inflection point judging section 12 judges high atmospheric pressure, etc. passes.

When a state of decrease or no change continues as an atmospheric pressure tendency from ten hours before and when the decrease is 4 hPa or more and then the increase is 1 hPa, the atmospheric pressure inflection point judging section 12 judges low atmospheric pressure, etc. passes.

According to the present embodiment, since the atmospheric pressure is measured every two hours, the atmospheric pressure value measured in a span of the past ten hours from the present time is six times including the measurement of the present time.

When the atmospheric pressure is measured in an interval shorter than two hours, atmospheric pressure value of six times or more can be referred in the judgment.

When it is judged whether or not a high atmospheric pressure, etc. or a low atmospheric pressure, etc. passes, among the plurality of atmospheric pressures measured successively, the judgment is performed based on atmospheric pressure values measured in at least three points of time including at least the atmospheric pressure value measured at present.

It is preferable to refer to more measured atmospheric pressure values in order to enhance accuracy of judgment.

The display control section 13 is a functional section which controls the display of the display section 5 and outputs display data to the decoder driver 52.

According to the present embodiment, the display section 5 is provided with a plurality of display areas such as time display area 511, temperature display area 512, atmospheric pressure display area 513, atmospheric pressure change graph area 514, mode display area 515, atmospheric pressure difference value display area 516, mark display area 517, etc.

The display control section 13 outputs to the decoder driver 52 display data showing characters, figures, etc. to be displayed in each display area.

The display control section 13 includes the mark display control section 131 which controls display and non-display of each segment of the mark display area of the display section 5.

The mark display control section 131 is an informing control member which controls the informing member to inform to the user the atmospheric pressure tendency based on the judgment result that the atmospheric pressure inflection point judging section 12 which is the atmospheric pressure inflection point judging member judges that there is an inflection point of the atmospheric pressure.

According to the present embodiment, the mark display control section 131 functions as a mark display control member which controls the display section 5, which is the informing member, to display the inflection point mark showing the inflection point of the atmospheric pressure as the atmospheric pressure tendency based on the judgment result by the atmospheric pressure inflection point judging section 12.

According to the present embodiment, the display control section 13 controls the informing member to inform to the user the atmospheric pressure tendency based on the judgment result that the atmospheric pressure sharp change judging section 11 which is the atmospheric sharp change judging member judges that there is a sharp increase or sharp decrease of the atmospheric pressure.

According to the present embodiment, the display control section 13 controls the display section 5 to display the sharp change mark showing there is a sharp change in the atmospheric pressure corresponding to the atmospheric pressure tendency based on the judgment result by the atmospheric pressure sharp change judging section 11.

Specifically, when the atmospheric pressure sharp change judging section 11 judges that there is a sharp increase of the atmospheric pressure, the display control section 13 controls the display section 5 to display a sharp change mark of an upward arrow (see FIG. 3) meaning the sharp increase of the atmospheric pressure.

When the atmospheric pressure sharp change judging section 11 judges that there is a sharp decrease of the atmospheric pressure, the display control section 13 controls the display section 5 to display a sharp change mark of a downward arrow (see FIG. 3) meaning the sharp decrease of the atmospheric pressure.

When the atmospheric pressure inflection point judging section 12 (atmospheric pressure inflection point judging member) judges that the high atmospheric pressure, etc. passes after the high atmospheric pressure, etc. is near, the display control section 13 controls the display section 5 to display the inflection point mark (see FIG. 3) meaning the inflection point of the atmospheric pressure changing from increase to decrease.

When the atmospheric pressure inflection point judging section 12 (atmospheric pressure inflection point judging member) judges that the low atmospheric pressure, etc. passes after the low atmospheric pressure, etc. is near, the display control section 13 controls the display section 5 to display the inflection point mark (see FIG. 3) meaning the inflection point of the atmospheric pressure changing from decrease to increase.

Next, the operation of the watch 100 which is the atmospheric pressure tendency informing apparatus of the present embodiment is described with reference to FIG. 5 to FIG. 9.

Figure 5:
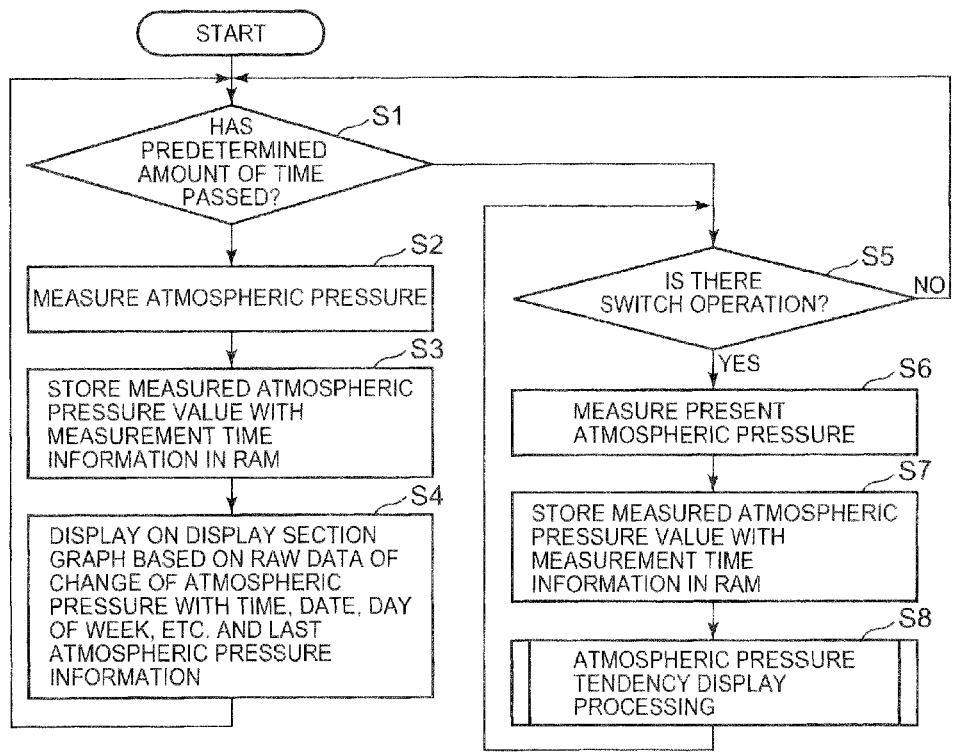
FIG. 5 is a flowchart showing an entire flow of control processing of a watch including the atmospheric pressure tendency informing function of the present embodiment.

As shown in FIG. 5, the control section 10 constantly determines whether or not a predetermined amount of time (in the present embodiment, two hours) passes (step S1).

When the control section 10 determines that the predetermined amount of time passes (in the present embodiment, two hours) (step S1; YES), the control section 10 operates the atmospheric pressure sensor 41 to measure the atmospheric pressure (step S2)

The atmospheric pressure value measured by the atmospheric pressure sensor 41 is stored in the storage area of the atmospheric pressure value measured in interval of the display register of the RAM 22 corresponded to the time information when the measurement is performed (step S3).

The control section 10 performs the time display, etc. based on the timing signal output from the timing signal generating circuit 33 as well as display the last obtained atmospheric pressure value in the atmospheric pressure display area 513.

The control section 10 displays the graph showing the change in the atmospheric pressure of the past ten hours in the atmospheric pressure change graph area 514 and displays the display showing the relation between the last value of atmospheric pressure and the past value of atmospheric pressure with a pointer in the atmospheric pressure difference value display area 516 (step S4).

The control section 10 repeats the sequence of processing from step S1 as necessary.

When the control section 10 determines that a predetermined amount of time (in the present embodiment, two hours) has not passed (step S1; NO), the control section 10 determines whether or not an instruction to switch to barometer mode is input by operation of the switch from the switch section 4 (step S5).

When the switch operation is not performed (step S5; NO), the control section 10 returns to step S1 and repeats the determining processing.

When the switch operation is performed and the instruction to switch to the barometer mode is input (step S5; YES), the control section 10 operates the atmospheric pressure sensor 41 to measure the present atmospheric pressure (step S6).

The atmospheric pressure value measured by the atmospheric pressure sensor 41 is stored in the present atmospheric pressure value storage area of the display register of the RAM 22 corresponded with the time information when the measurement is performed (step S7).

Then, the control section 10 displays the character of "BARO" showing the barometer mode in the mode display area 515 of the display section 5 to perform atmospheric pressure tendency display processing (step S8).

When the sequence of the atmospheric pressure tendency display processing ends, the control section 10 returns to step S5 and repeats the sequence of processing.

Next, the specific content of the atmospheric pressure tendency display processing (atmospheric pressure tendency informing method of the present embodiment) (step S8) is described with reference to FIG. 6 to FIG. 9.

Figure 6:
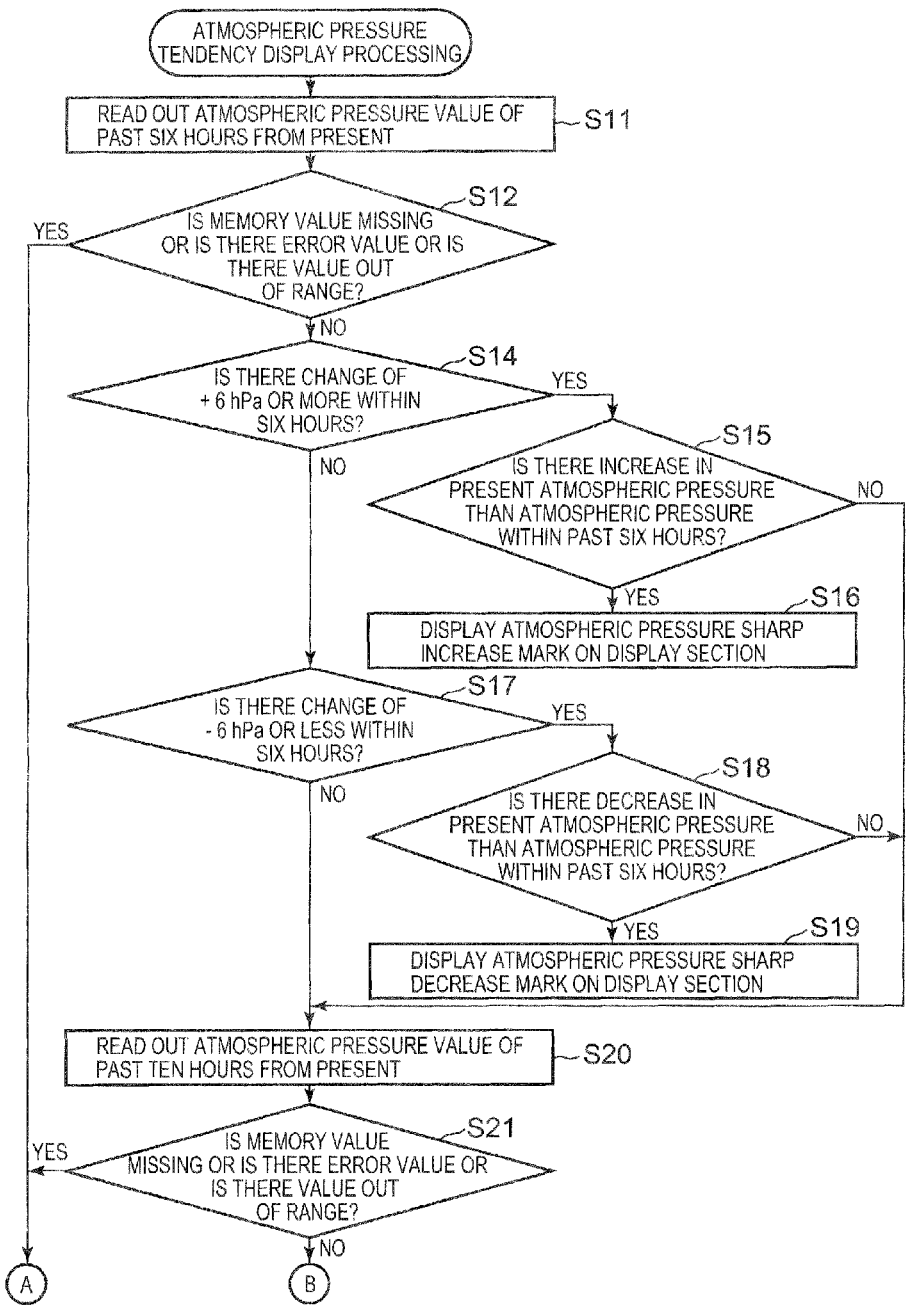
FIG. 6 is a flowchart showing atmospheric pressure tendency display processing described in FIG. 5.

As shown in FIG. 6 to FIG. 9, according to the present embodiment, the control section 10 first judges whether or not there is a sharp change in the atmospheric pressure (see FIG. 6 and FIG. 8).

Figure 7:
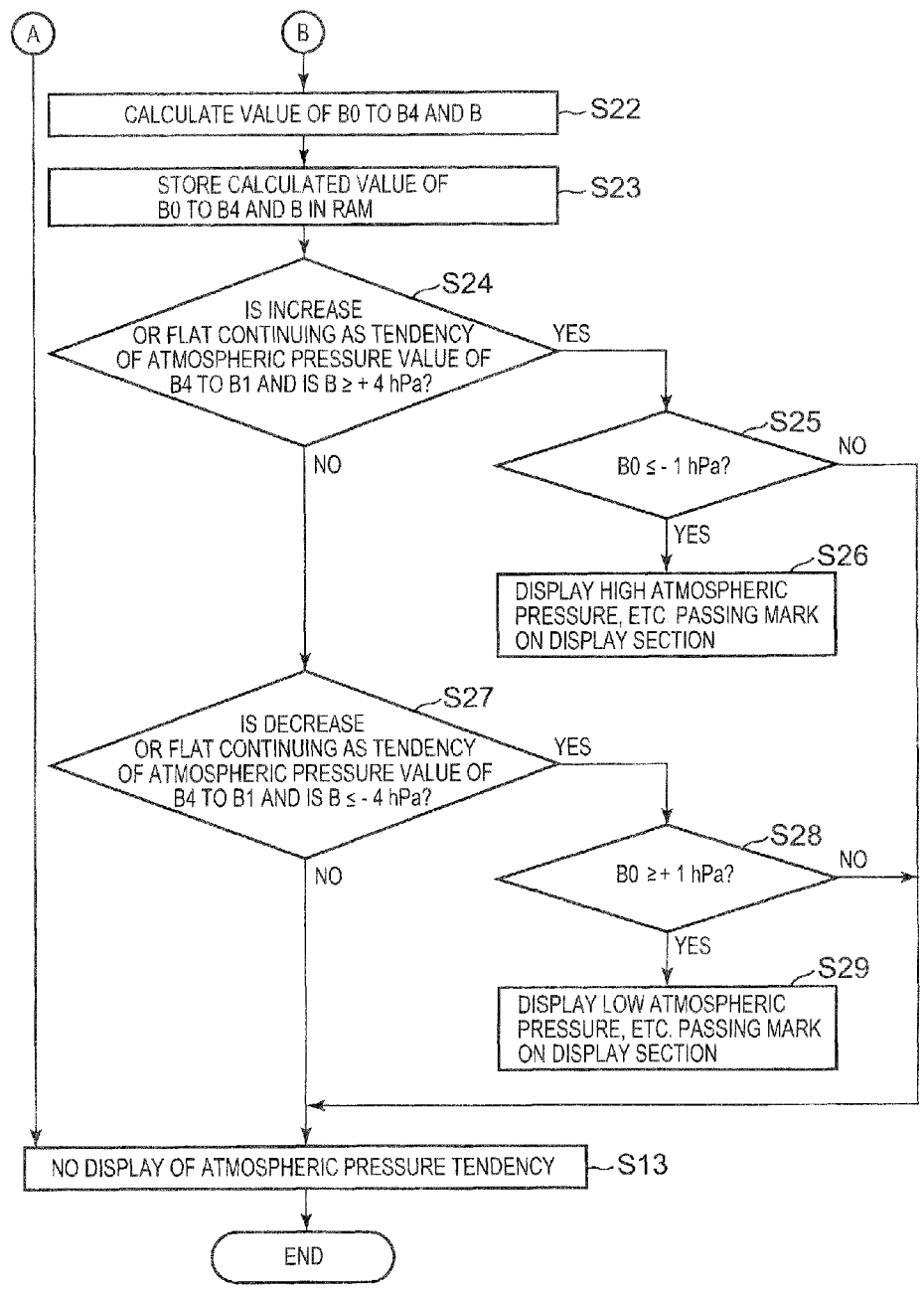
FIG. 7 is a flowchart showing atmospheric pressure tendency display processing described in FIG. 5.

When the control section 10 judges that there is no sharp change in the atmospheric pressure, the control section 10 judges whether or not there is an inflection point of the atmospheric pressure (see FIG. 7 and FIG. 9).

The order of which one of the judgment of the sharp change in the atmospheric pressure and the judgment of the inflection point of the atmospheric pressure is performed before is not limited to the order shown in the present embodiment.

However, the sharp change in the atmospheric pressure greatly influences the action plan, etc. of the user in outdoor activities.

Therefore, it is preferable that the sharp change mark is preferentially displayed when it is judged that there is a sharp change in the atmospheric pressure to inform and to call attention to the user.

The atmospheric pressure tendency displaying processing as shown in FIG. 6 and FIG. 8 is described.

First, the control section 10 (atmospheric pressure sharp change judging section 11) reads out the measured atmospheric pressure value (memory value) of the past six hours from the present from the display register of the RAM 22 (step S11).

The control section 10 determines whether the memory value is missing or there is an error value or there is a value out of range in the read out memory value (step S12).

When the control section 10 judges that the memory value is missing or there is an error value or there is a value out of range (step S12; YES), the control section 10 determines not to display any atmospheric pressure tendency (step S13).

When the control section 10 judges that there is no memory value missing or there is no error value or there is no value out of range (step S12; NO), the control section 10 (atmospheric pressure sharp change judging section 11) judges whether or not there is a change of +6 hPa or more within six hours (step S14).

When the control section 10 judges that there is a change of +6 hPa or more within six hours (step S14; YES), the control section 10 (atmospheric pressure sharp change judging section 11) further judges whether or not there is an increase in the present atmospheric pressure than the atmospheric pressure within the past six hours (step S15).

When the control section 10 judges that there is an increase in the present atmospheric pressure than the atmospheric pressure within the past six hours (step S15; YES), the control section 10 (mark display control section 131) displays the atmospheric pressure sharp increase mark (sharp change mark) on the display section 5 (step S16).

At the same time as the display of the atmospheric pressure sharp increase mark (sharp change mark) or after the mark is displayed, a message (for example, "atmospheric pressure sharp increase") showing the meaning of the mark, a comment corresponding to the above (for example, see FIG. 3) or the like can be displayed on the display section 5.

When the control section 10 judges that the present atmospheric pressure is not changed +6 hPa or more within six hours (step S14; NO), the control section 10 (the atmospheric pressure sharp change judging section 11) further judges whether or not there is a change of −6 hPa or less within six hours (step S17).

When the control section 10 judges that there is a change of −6 hPa or less within six hours (step S17; YES), the control section 10 (atmospheric pressure sharp change judging section 11) further judges whether or not there is a decrease in the present atmospheric pressure than the atmospheric pressure within the past six hours (step S18).

When the control section 10 judges that there is a decrease in the present atmospheric pressure than the atmospheric pressure within the past six hours (step S18; YES), the control section 10 (mark display control section 131) displays the atmospheric pressure sharp decrease mark (sharp change mark) on the display section 5 (step S19).

At the same time as the display of the atmospheric pressure sharp decrease mark (sharp change mark) or after the mark is displayed, a message (for example "atmospheric pressure sharp decrease") showing the meaning of the mark, a comment corresponding to the above (for example, see FIG. 3) or the like can be displayed on the display section 5.

When the control section 10 judges that there is no increase in the present atmospheric pressure than the atmospheric pressure within the past six hours (step S15; NO) or that there is no change of −6 hPa or less within six hours (step S17; NO) or that there is no decrease in the present atmospheric pressure than the atmospheric pressure within the past six hours (step S18; NO), as shown in FIG. 6 and FIG. 9, the control section 10 (atmospheric pressure inflection point judging section 12) reads out the measured atmospheric pressure value (memory value) of the past ten hours from the present time from the display register of the RAM 22 (step S20).

The control section 10 determines whether the memory value is missing or there is an error value or there is a value out of range in the read out memory value (step S21).

When the control section 10 judges that the memory value is missing or there is an error value or there is a value out of range (step S21; YES), the control section 10 determines not to display any atmospheric pressure tendency (step S13).

When the control section 10 judges that there is no memory value missing or there is no error value or there is no value out of range (step S21; NO), the control section 10 (atmospheric pressure inflection point judging section 12) calculates the values B0 to B5 and B from A0 to A5 which are the measured atmospheric pressure value (memory value) of the past ten hours from the present (step S22).

The control section 10 stores the value in the calculated result temporary storage area of the display register of the RAM 22 (step S23).

Then, the control section 10 (atmospheric pressure inflection point judging section 12) judges whether or not the state of increase or no change ("FLAT" shown in FIG. 7) continues as the tendency of the atmospheric pressure difference value of B4 to B1 and there is an increase of atmospheric pressure of +4 hPa or more (in other words, B≥+4 hPa) in a span of the past ten hours from the present (in other words, judgment of the high atmospheric pressure, etc. being near) (step S24).

When the control section 10 judges that the increase or the state of no change continues as the tendency of the atmospheric pressure difference value of B4 to B1 and that there is an increase of atmospheric pressure of +4 hPa or more in a span of the past ten hours from the present (step S24; YES), the control section 10 (atmospheric pressure inflection point judging section 12) further judges whether or not B0≤−1 hPa (in other words, judgment of the high atmospheric pressure, etc. passing) (step S25).

When the control section 10 judges that B0≤−1 hPa (step S25; YES), the control section 10 (mark display control section 131) displays the high atmospheric pressure, etc. passing mark (inflection point mark) on the display section 5 (step S26).

At the same time as the display of the high atmospheric pressure, etc. passing mark (inflection point mark) or after the mark is displayed, a message (for example, "high atmospheric pressure, etc. passing") showing the meaning of the mark, a comment corresponding to the above (for example, see FIG. 3) or the like can be displayed on the display section 5.

When the control section 10 judges that the increase or the state of no change does not continue as the tendency of the atmospheric pressure difference value of B4 to B1 or that there is no increase of atmospheric pressure of +4 hPa or more in a span of the past ten hours from the present (step S24; NO), the control section 10 (atmospheric pressure inflection point judging section 12) further judges whether or not the state of decrease or no change ("FLAT" shown in FIG. 7) continues as the tendency of the atmospheric pressure difference value of B4 to B1 and there is a decrease of atmospheric pressure of −4 hPa or less (in other words, B≤−4 hPa) in a span of the past ten hours from the present (in other words, judgment of the low atmospheric pressure, etc. being near) (step S27).

When the control section 10 judges the decrease or the state of no change continues as the tendency of the atmospheric pressure difference value of B4 to B1 and there is a decrease of atmospheric pressure of −4 hPa or less in a span of the past ten hours from the present (step S27; YES), the control section 10 (atmospheric pressure inflection point judging section 12) further judges whether or not B0≥+1 hPa (in other words, judgment of the low atmospheric pressure, etc. passing) (step S28).

When the control section 10 judges that B0≥+1 hPa (step S28; YES), the control section 10 (mark display control section 131) displays the low atmospheric pressure, etc. passing mark (inflection point mark) on the display section 5 (step S29).

At the same time as the display of the low atmospheric pressure, etc. passing mark (inflection point mark) or after the mark is displayed, a message (for example "low atmospheric pressure, etc. passing") showing the meaning of the mark, a comment corresponding to the above (for example, see FIG. 3) or the like can be displayed on the display section 5.

When the control section 10 judges that it is not B0≤−1 hPa (step S25; NO) or that the decrease or the state of no change does not continue as the tendency of the atmospheric pressure difference value of B4 to B1 or there is no decrease of atmospheric pressure of −4 hPa or less in a span of the past ten hours from the present (step S27; NO) or that it is not B0≥+1 hPa (step S28; NO), the control section 10 (atmospheric pressure inflection point judging section 12) determines not to display any atmospheric pressure tendency (step S13).

As described above, the watch 100 of the present embodiment includes a display section 5 as an informing member which informs the atmospheric pressure tendency and the display section displays an inflection point mark as an atmospheric pressure tendency.

When the atmospheric pressure inflection point judging section 12 judges there is an inflection point of atmospheric pressure, the inflection point mark in an arrow shape showing the inflection point of atmospheric pressure as atmospheric pressure tendency is displayed in the mark display area 517 of the display section 5 based on the judgment result.

Therefore, the user can visually and intuitively understand that the inflection point of the atmospheric pressure occurs simply by looking at the inflection point mark displayed on the display section 5.

Therefore, the user with little knowledge of how change of atmospheric pressure influences the weather, etc. can easily predict the future weather etc. and act and judge suitably considering the weather etc.

When it is judged that there is a sharp change in the atmospheric pressure, the sharp change of the atmospheric pressure is informed to the user as the atmospheric pressure tendency based on the judgment result.

The sharp change in the atmospheric pressure greatly influences the weather, etc. and such important phenomenon should be carefully observed especially when planning an action plan for outdoor activities such as mountain climbing.

By informing that a sharp change in the atmospheric pressure occurs, the user can act and judge suitably considering the future weather, etc.

When there is such sharp change in the atmospheric pressure, a sharp change mark showing the sharp change of atmospheric pressure as the atmospheric pressure change tendency is displayed in the mark display area 517 of the display section 5.

Therefore, the user can visually and intuitively understand that there is the sharp change in the atmospheric pressure simply by looking at the sharp change mark displayed on the display section 5.

Therefore, the user with little knowledge of how change of atmospheric pressure influences the weather, etc. can easily predict the future weather etc. and act and judge suitably considering the weather etc.

Since the atmospheric pressure tendency is informed by displaying the inflection point mark and the sharp change mark, the atmospheric pressure tendency can be easily understood by the user, and the informed atmospheric pressure tendency analyzes change of atmospheric pressure such as inflection point and sharp change of atmospheric pressure.

Therefore, reliability is higher compared to displaying a weather mark, etc. and it is possible to provide accurate information to the user.

According to the present embodiment, the message showing the meaning of the inflection point mark and/or the comment of what can be understood from the inflection point of atmospheric pressure is stored in the ROM 21 corresponded with the inflection point mark.

Such message and comment are displayed on the display section 5 together with the inflection point mark or after the inflection point mark is displayed.

Moreover, in the present embodiment, the message showing the meaning of the sharp change mark and/or the comment of what can be understood from the sharp change in atmospheric pressure is stored in the ROM 21 corresponded with the sharp change mark.

Such message and comment can be displayed on the display section 5 together with the inflection point mark or after the inflection point mark is displayed.

The above embodiment of the present invention is described, however, the present invention is not limited to the above embodiment. Various modifications can be realized without leaving the scope of the invention.

For example, the above described embodiment describes the atmospheric pressure tendency informing apparatus as a watch including an atmospheric pressure tendency informing function (watch 100), however the atmospheric pressure tendency informing apparatus is not limited to the watch including an atmospheric pressure tendency informing function.

For example, the atmospheric pressure tendency informing apparatus can be a portable terminal apparatus, etc. such as a portable telephone, etc.

The present embodiment describes an example where the informing member which informs the atmospheric pressure tendency is a display section 5, however, the informing member is not limited to the display section 5. For example, an audio output member such as a speaker which informs the atmospheric pressure tendency by alarm, audio, etc. can be employed.

A plurality of informing members can be provided so that the inflection point mark and the sudden change mark is displayed on the display section 5 and the message, comments, etc. are output as the audio, etc. from the speaker.

The present embodiment describes an example where four marks (in other words, high atmospheric pressure passing mark and low atmospheric pressure passing mark which are inflection point marks and atmospheric pressure sharp increase mark and atmospheric pressure sharp decrease mark which are sharp change marks) can be displayed as the atmospheric pressure tendency, however, the marks which can be displayed as the atmospheric pressure tendency is not limited to the four types.

A configuration where more marks can be displayed or a configuration where only two types of inflection point marks can be displayed is possible.

The present embodiment describes an example where the ROM 21 functions as a storage medium which stores the mark as the atmospheric pressure tendency and the meaning (in other words, message) and the comment corresponding to the mark. However, the storage medium is not limited to the ROM 21, and other storage mediums to store the above can be provided.

The message and comment can be informed to the user by audio output from a speaker, etc. and in this case, the audio data corresponding to the above is stored in the ROM 21 in advance.

The present invention is not limited to the above embodiment and can be suitably changed.

The embodiment of the present invention is described above, however, the scope of the present invention is not limited to the above embodiment and includes the scope of invention described in the claims and its equivalents.

The entire disclosure of Japanese Patent Application No. 2011-107852 filed on May 13, 2011 including specification, claims, drawings and abstract are incorporated herein by reference in its entirety.

What is claimed is:

1. An atmospheric pressure tendency informing apparatus comprising:
   a display which displays an atmospheric pressure tendency;
   an atmospheric pressure sensor which measures atmospheric pressure each time a predetermined amount of time passes;
   an atmospheric pressure inflection point judging section which judges whether there is an inflection point of atmospheric pressure, based on atmospheric pressure values of at least three points of time including an atmospheric pressure value measured at present among a plurality of atmospheric pressure values measured successively by the atmospheric pressure sensor;
   an atmospheric pressure sharp change judging section which judges whether there is a sharp change in the atmospheric pressure based on atmospheric pressure values of at least two points of time including an atmospheric pressure value measured at present among a plurality of atmospheric pressure values measured successively by the atmospheric pressure sensor; and a mark display control section which controls the display to display an inflection point mark showing an inflection point of atmospheric pressure as the atmospheric pressure tendency or a sharp change mark showing a sharp change of atmospheric pressure as the atmospheric pressure tendency based on a judgment result when the atmospheric pressure inflection point judging section judges that there is an inflection point of atmospheric pressure or when the atmospheric pressure sharp change judging section judges that there is a sharp change in the atmospheric pressure, wherein the display includes a plurality of segments adjacent to each other for displaying a segment with an upward arrow and a segment with a downward arrow; and wherein the mark display control section controls the display to display the inflection point mark or the sharp change mark by switching each segment independently between display and non-display.

2. The atmospheric pressure tendency informing apparatus according to claim 1, further comprising:

a storage section which stores a message showing a meaning of the inflection point mark and/or a comment of what can be understood from the inflection point of the atmospheric pressure corresponding to the inflection point mark, wherein, based on the judgment result by the atmospheric pressure inflection point judging section, the mark display control section reads out the message and/or the comment from the storage section for display on the display together with the inflection point mark or after displaying the inflection point mark.

3. The atmospheric pressure informing apparatus according to claim 1, wherein the atmospheric pressure inflection point judging section judges that there is an inflection point of the atmospheric pressure when (a) the atmospheric pressure value successively measured by the atmospheric pressure sensor increases by at least a predetermined first atmospheric pressure value, and then the atmospheric pressure value decreases by at least a predetermined second atmospheric pressure value, or (b) the atmospheric pressure value successively measured by the atmospheric pressure sensor decreases by at least a predetermined first atmospheric pressure value, and then the atmospheric pressure value increases by at least a predetermined second atmospheric pressure value.

4. The atmospheric pressure informing apparatus according to claim 1, wherein:

the atmospheric pressure inflection point judging section judges whether high atmospheric pressure passes or low atmospheric passes based on atmospheric pressure values of at least three points of time including the atmospheric pressure value measured at present among the plurality of atmospheric pressure values successively measured by the atmospheric pressure sensor; and the mark display control section controls the display to display a judgment result when the atmospheric pressure inflection point judging section judges that there is a passing of high atmospheric pressure or low atmospheric pressure.

5. An atmospheric pressure tendency informing method for an atmospheric pressure tendency informing apparatus including a display which displays an atmospheric pressure tendency, and an atmospheric pressure sensor which measures an atmospheric pressure value each time a predetermined amount of time passes, the method comprising:

Judging whether there is an inflection point of atmospheric pressure, based on atmospheric pressure values of at least three points of time including an atmospheric pressure value measured at present among a plurality of atmospheric pressure values measured successively by the atmospheric pressure sensor;

judging whether there is a sharp change in the atmospheric pressure based on atmospheric pressure values of at least two points of time including an atmospheric pressure value measured at present among a plurality of atmospheric pressure values measured successively by the atmospheric pressure sensor; and controlling the display to display an inflection point mark showing an inflection point of atmospheric pressure as the atmospheric pressure tendency or a sharp change mark showing a sharp change of atmospheric pressure as the atmospheric pressure tendency based on a judgment result when it is judged that there is an inflection point of atmospheric pressure or a sharp change in the atmospheric pressure;

wherein the display includes a plurality of segments adjacent to each other for displaying a segment with an upward arrow and a segment with a downward arrow; and wherein the display is controlled to display the inflection point mark or the sharp change mark by switching each segment independently between display and non-display.

6. The atmospheric pressure tendency informing method according to claim 5, wherein:

the atmospheric pressure tendency informing apparatus further includes a storage section which stores a message showing a meaning of the inflection point mark and/or a comment of what can be understood from the inflection point of the atmospheric pressure corresponding to the inflection point mark; and based on the judgment result of the atmospheric pressure inflection point, the message and/or the comment is read out from the storage section for display on the display together with the inflection point mark or after displaying the inflection point mark.

7. The atmospheric pressure informing method according to claim 5, wherein it is judged that there is an inflection point of the atmospheric pressure when (a) the atmospheric pressure value successively measured by the atmospheric pressure sensor increases by at least a predetermined first atmospheric pressure value, and then the atmospheric pressure value decreases by at least a predetermined second atmospheric pressure value, or (b) the atmospheric pressure value successively measured by the atmospheric pressure sensor decreases by at least a predetermined first atmospheric pressure value, and then the atmospheric pressure value increases by at least a predetermined second atmospheric pressure value.

8. The atmospheric pressure informing method according to claim 5, further comprising:

judging whether high atmospheric pressure passes or low atmospheric passes based on atmospheric pressure values of at least three points of time including the atmospheric pressure value measured at present among the plurality of atmospheric pressure values successively measured by the atmospheric pressure sensor; and controlling the display to display a judgment result when the atmospheric pressure inflection point judging step judges that there is a passing of high atmospheric pressure or low atmospheric pressure.

* * * * *

UNITED STATES PATENT AND TRADEMARK OFFICE
CERTIFICATE OF CORRECTION

PATENT NO.         : 9,103,945 B2
APPLICATION NO.    : 13/468271
DATED              : August 11, 2015
INVENTOR(S)        : Takeshi Miyake et al.

It is certified that error appears in the above-identified patent and that said Letters Patent is hereby corrected as shown below:

Claims

Column 19, claim 3, line 1, after "pressure" insert --tendency--.

Column 19, claim 4, line 1, after "pressure" insert --tendency--.

Column 20, claim 5, line 1, delete "Judging" and insert --judging--.

Column 20, claim 7, line 1, after "pressure" insert --tendency--.

Column 20, claim 8, line 1, after "pressure" insert --tendency--.

Signed and Sealed this
Twenty-sixth Day of January, 2016

Michelle K. Lee
*Director of the United States Patent and Trademark Office*